United States Patent
Maier

(10) Patent No.: US 9,880,457 B2
(45) Date of Patent: Jan. 30, 2018

(54) APPARATUS FOR THE AUTOMATIC POSITIONING OF COUPLED CAMERAS FOR THREE-DIMENSIONAL IMAGE REPRESENTATION

(76) Inventor: Florian Maier, Gilching (DE)

( * ) Notice: Subject to any disclaimer, the term of this patent is extended or adjusted under 35 U.S.C. 154(b) by 814 days.

(21) Appl. No.: 12/657,489

(22) Filed: Jan. 20, 2010

(65) Prior Publication Data

US 2010/0295925 A1 Nov. 25, 2010

Related U.S. Application Data

(63) Continuation-in-part of application No. PCT/DE2008/001192, filed on Jul. 21, 2008.

(30) Foreign Application Priority Data

Jul. 24, 2007 (DE) .................... 20 2007 010 389 U

(51) Int. Cl.
H04N 15/00 (2006.01)
G03B 35/10 (2006.01)
H04N 13/02 (2006.01)

(52) U.S. Cl.
CPC ......... G03B 35/10 (2013.01); H04N 13/0239 (2013.01); H04N 13/0242 (2013.01); H04N 13/0296 (2013.01)

(58) Field of Classification Search
None
See application file for complete search history.

(56) References Cited

U.S. PATENT DOCUMENTS

| 5,142,357 | A | * | 8/1992 | Lipton et al. ................... 348/48 |
| 5,886,747 | A | * | 3/1999 | Tzidon et al. ................ 348/587 |
| 7,068,274 | B2 | * | 6/2006 | Welch et al. ................. 345/426 |
| 2002/0158984 | A1 | * | 10/2002 | Brodsky et al. ............. 348/340 |
| 2007/0036444 | A1 | * | 2/2007 | Yoshida ........................ 382/232 |
| 2008/0049100 | A1 | * | 2/2008 | Lipton et al. ................... 348/43 |

FOREIGN PATENT DOCUMENTS

WO WO 2006038570 A1 * 4/2006

* cited by examiner

*Primary Examiner* — James M Anderson, II
(74) *Attorney, Agent, or Firm* — Henry M. Feiereisen LLC

(57) ABSTRACT

Apparatus for the automatic positioning of at least two, or for the automatic selection from at least three cameras (K), coupled for three-dimensional image recording, including a device for distance measurement (EM), which is configured to measure the distances of relevant points (0) in the object space (OR) relative to the recording apparatus (A) and to supply corresponding output signals, wherein the relevant points (0) can be selected manually or automatically; a computer unit (RE), which is configured to calculate the parameters such as stereo base, swivel angle, correction parameters and internal parameters of the cameras (K) and/or a positioning device (P), to adjust the cameras (K) depending on the calculated parameters; and a switching apparatus (S), which together with the computer unit (RE) can form a single unit which can effect a selection of camera bundles depending on the size of the stereo base.

15 Claims, 2 Drawing Sheets

APPARATUS FOR THE AUTOMATIC POSITIONING OF COUPLED CAMERAS FOR THREE-DIMENSIONAL IMAGE REPRESENTATION

The invention concerns a device for automatic positioning of at least two coupled cameras for a recording of three-dimensional images which are displayed with multi-channel image display techniques. In this context positioning is the adjustment of the interaxial, the convergence of the cameras on the so-called point-of-interest (usually this is a punctual object in screen window distance) and the usage of appropriate camera parameters for this. A distance measurement of defined points within a recording set (object space) will be taken as a reference for the automatic determination of said parameters.

CURRENT STATE OF THE ART

At least two spatial perspectives of an object intended for recording are required for the recording of three-dimensional images which are shown with multi-channel image display techniques. The individual images (for example left and right perspective) are combined into one three-dimensional image (i.e. see Falk, D.; Brill, D.; Stork, D.; Ein Blick ins Licht: Einblicke in die Natur des Lichts und des Sehens, in Farbe und Fotografie; Birkhäuser Verlag, Basel-Boston and Springer Verlag, Berlin-Heidelberg; 1990; Page 230 ff). These images can be shown with known image separation techniques, such as the polarization method, methods with shutterglasses, autostereoscopic lenticular methods, parallax-barrier or similar methods for three-dimensional image display. All of these methods require at least two views of an object from different perspectives. These views are usually being generated by at least two cameras which are positioned in different, adjacent points of perspective (see Sand R.; Dreidimensionales Fernsehen; in DE-Z: Fernseh-und Kino-Technik, 37, Nr. 8/1983; Page 321 ff).

These cameras are either side-by-side, points into the same direction, but with slightly different perspectives (parallaxes); or they are positioned on two camera levels which are combined into a single level throughout a semi-transparent mirror. Furthermore it is also possible to position two cameras on at least two levels (see the exemplary design in patent DE 10 2005 042 413). Herewith the resulting visual angles of the camera are looking towards the same direction too and the recording will be made from slightly different perspectives.

Very often a fixed distance between the two cameras is chosen, but this will result in a reduced quality of the three-dimensional reproduction. It is necessary to adapt the interaxial (resulting distance of the midpoint of two objects to each other) to every three-dimensional recording set and motive in accordance to additional parameters such as the dimensions of the three-dimensional images during a later projection, in order to exploit the full dynamic range of a three-dimensional display technique and not to exceed the physiological limits during the viewing of a record of three-dimensional images.

This concerns the recording with two or more parallel positioned cameras (parallel optical axes), as well as the recording with a set-up of cameras with converging optical axes. In a set-up of cameras with converging optical axes, the cameras will be converged on the point of interest if the effect cannot be achieved by a later horizontal displacement of the individual images into the opposite direction in relation to each other. In the case of converging axes this point of interest (crossing point of the optical axes) will be presented upon the so-called screen plane (this is the physical surface of the projection screen where the image is being projected upon), without having to process three-dimensional display by displacement as described before. The reason for it being seen by the viewer in the screen plane is that the object (i.e. in the left and right image) has a disparity of zero in this point of interest.

The fact that the usable sensor size might get too small (because of a necessary cropping at the left and right sides of the images) is one of the reasons for a convergent set-up of the cameras instead of a later horizontal displacement of the stereoscopic images (i.e. left and right perspective) in relation to each other. Therefore some recording devices do not only allow an adjustment of the interaxial between the two cameras, but also allow convergence of the cameras with a horizontal rotation angle onto the point of interest.

Problem and Challenge

These two parameters (interaxial and convergence setting of the cameras) of a device for three-dimensional recording are state of the art and can be determined through the estimation and experimentation of the operator. A specific adjustment of the diverse parameters is done by retroactive consideration of the result with a specific correction. This requires a lot of experience and is hardly accomplishable by laymen, because the testing of adequate settings of the parameters is time consuming Furthermore not all of the display parameters for later three-dimensional projection or displaying methods can be simulated on the recording set.

The invention is based upon the challenge to eliminate the aforementioned disadvantages of the current state of the art in a simple way and to provide a universally usable device which can be adapted individually to specific object parameters, which features a high level of automation and fully supports the camera operator with the settings.

SUMMARY OF THE INVENTION

As a solution the invention offers a device with the characteristics of claim 1 and 2. Beneficial features are summarized in claims 3 to 15. The term "camera" includes photography as well as recording of moving images.

The device uses the set-up of at least two coupled cameras, as they are described in the state of technology above. These two cameras will be adjusted to specific parameters such as interaxial and if needed convergence by a positioning device. These adjustments can be done manually with appropriate high-precision mechanics as well as with motor-control.

In order to assign the correct adjustment a system for distance measurement of significant points in the object space in relation to the recording device will be made. The image plane (sensor plane) can be chosen as the point of reference within the recording device which consists of cameras, a mounting and positioning device and optionally a beam splitter set-up. Relevant points of the object space (such as the near point, the screen plane and the far point) will be selected manually or automatically. The distance measurement can be achieved through a current technique, with an ultrasonic device, an autofocus system, a laser measurement system, a stereo camera with the assistance of reconstruction algorithms, or triangulation, etc. The distance measurement can also be achieved through an image analysis of the available cameras with the help of a known, fixed camera distance or the readout of the actual camera distance.

Here the distance measurement preferably incorporates the image relevant or the visible parts of the object space of the image, or alternatively the limits and the specifications the operator has inputted in the system according to artistic/creative considerations.

The output signals of the distance measurement are registered by a computational device through automatic or manual input of the aforementioned original data and the device calculates parameters such as the optimal or maximal interaxial and if required, the angle of convergence, mechanical or optical correction parameters or camera parameters such as the focal point according to the weighting of the point of interest or the setting of the aperture or a retroactive displacement of the stereoscopic fields, etc.

Additional input data for the computational device can be e.g. pre-recorded data about used components or data read-outs of used components. Preferably the computational device can feature a user interface wherein parameters can be chosen, modified or entered manually. A constant update of the raw data is conceivable in the case of tracking shot, a zoom shot or movement of the recorded object, but can also be selectively turned off specifically.

The output parameters will be calculated from this data by a saved program by taking into account the future display set-up (e.g. display technique, size of the image, distance of the observer, etc.). These output parameters include e.g. the maximally feasible interaxial, the optimal interaxial, the angle of convergence of the cameras, or the displacement of the stereoscopic fields in relation to each other, correctional parameters, internal parameters of the cameras, etc. According to the parameters the program can make suggestions concerning the depth composition/execute suggestions/calculate boundaries of the three-dimensional image recording/calculate boundaries of future displays.

The alignment of the parameters can be updated automatically or adjusted to the conditions respectively. This means that the output parameters can be assigned to specific points in time (e.g. through synchronisation with the time code of the cameras) or space (e.g. through synchronisation with a motion-control device) (e.g. in a definable chronological and/or spatial sequence during the recording of moving images).

The output parameters now are transmitted (in a predefined, chronological order if applicable) either manually or electronically to the positioning device which features stepper motors preferably and to other components (e.g. lenses, cameras) if necessary.

The cameras are adjusted with the output parameters which were transmitted to the positioning device. Here a camera may have a fixed position, while the other camera or cameras are adjusted by the positioning device.

In order to avoid exceeding maximal boundaries during the three-dimensional image recording, the computational and/or the positioning device are equipped with functions or devices which preferably limit the adjustment procedure either electronically or mechanically (such as through a moveable arrester). The possibility of the operator intervening is still possible after the computation of the adjustment parameters in order to adjust the parameters to the specific circumstances of the recording.

Preferably the limits of the adjustment and the suggestions of positioning are shown in a display with suggestions for image composition and information about maximal boundaries. This display device can be, for example a monitor and/or a different display unit which can be attached to the recording device or the manual control unit. By way of example this display unit may consist of a number of LEDs in different states of activation.

Preferably the actual position of at least one camera is shown on this monitor and/or display unit. Likewise calculated suggestions for the modification of the positioning of at least one camera and/or the boundaries of display and/or suggestions for composition can be shown. Hereby relevant parts of the image and maximal action boundaries can be visualized, such as the minimal or maximal permitted distance to the camera with a specific interaxial. This is supposed to prevent the disparity of the images becoming too large if these boundaries are ignored and that the viewer will experience problems during viewing or even experience decomposition of the image in a worst case scenario.

The boundaries which were determined by the computational unit can also be shown on a monitor that is able to display a three-dimensional image. If a camera setup with resultant parallel optical axes is used for example, the retroactive displacement of the stereoscopic fields can be simulated automatically according to the chosen settings of the screenwindow. This can be achieved with a mechanic displacement of at least one monitor or visual display relative to another monitor or visual display on a two monitor display set-up with a semi-transparent mirror or a software controlled displacement on a single monitor or visual display on a single monitor display set-up for example (e.g. with the use of the anaglyph technique).

Preferably there should be the possibility for the visualization of the adjustment parameters and the boundaries for the operator and/or for other persons/actors in the object space (recording set) involved in the recording. For example this can be a projection of the available limits or the screenwindow into the object space or the visualization on a monitor/head-mounted-display (HMD). An example for the implementation would be a projection into the recording set, wherein "prohibited" parts of the image are being highlighted (e.g. marked in color); this marking can be switched off for the actual recording or rather displayed in a wavelength visible for human beings, but invisible for the camera due to a band-elimination filter. An alternative would be a projection system synchronized with the cameras over a genlock sync signal for example, which would take advantage of the pauses during recording (such as the blanking interval between two images) in order to project certain markers into the recording set and which would be switched off on time when the cameras are recording again. Thus the marked and projected areas would seem to be turned on for the integral perception of a human being, whereas they would not be visible for the three-dimensional image recording of the cameras. Alternatively these areas could be displayed on a monitor or an HMD visualization.

Preferably if the claimed device includes a recording tool which saves the calculated and adjusted data, as well as the data gathered from the used equipment as so-called metadata, which the device could provide again later on. Additional data would include e.g. the time code, the setting of the focal length, the setting of the iris, the setting of shutter, etc.

Another example of implementation could be a fully automated, three-dimensional camera unit, which includes all of the aforementioned components. Hereby all of the parameters of importance for the image would be quantified automatically (among others by a distance measurement device) and the interaxial and/or the angle of convergence and/or other parameters would be adjusted automatically and if necessary dynamically adapted to the actual recording conditions or the zoom setting if applicable.

The alternative solution could be a fixed camera set-up with several cameras which can be switched on and off, wherein cameras which are further away are switched on in case of an increase of the interaxial, as this would be the same as a virtual, automatic positioning. If a camera set-up consists of 4 cameras for example, the two inner cameras could be used for a small interaxial and the two outer cameras could be used in case of a larger interaxial if necessary for the recording of the three-dimensional image. The estimate if a small or large interaxial is required can be provided by the distance measurement device and the computational device as described above.

BENEFITS ACHIEVED

Through the high level of automation three-dimensional image recording becomes economically attractive for photography, as well as especially for the recording of moving images. Up to now the creation of three-dimensional material was linked to extensive experience and lots of trial and error, whereas precise three-dimensional recordings could be made within a short time with the support of the proposed device. Due to said device the burden of the decision making and the adjustment of the settings would be alleviated for the operator and this would make three-dimensional recording accessible to laymen.

Figure 1:
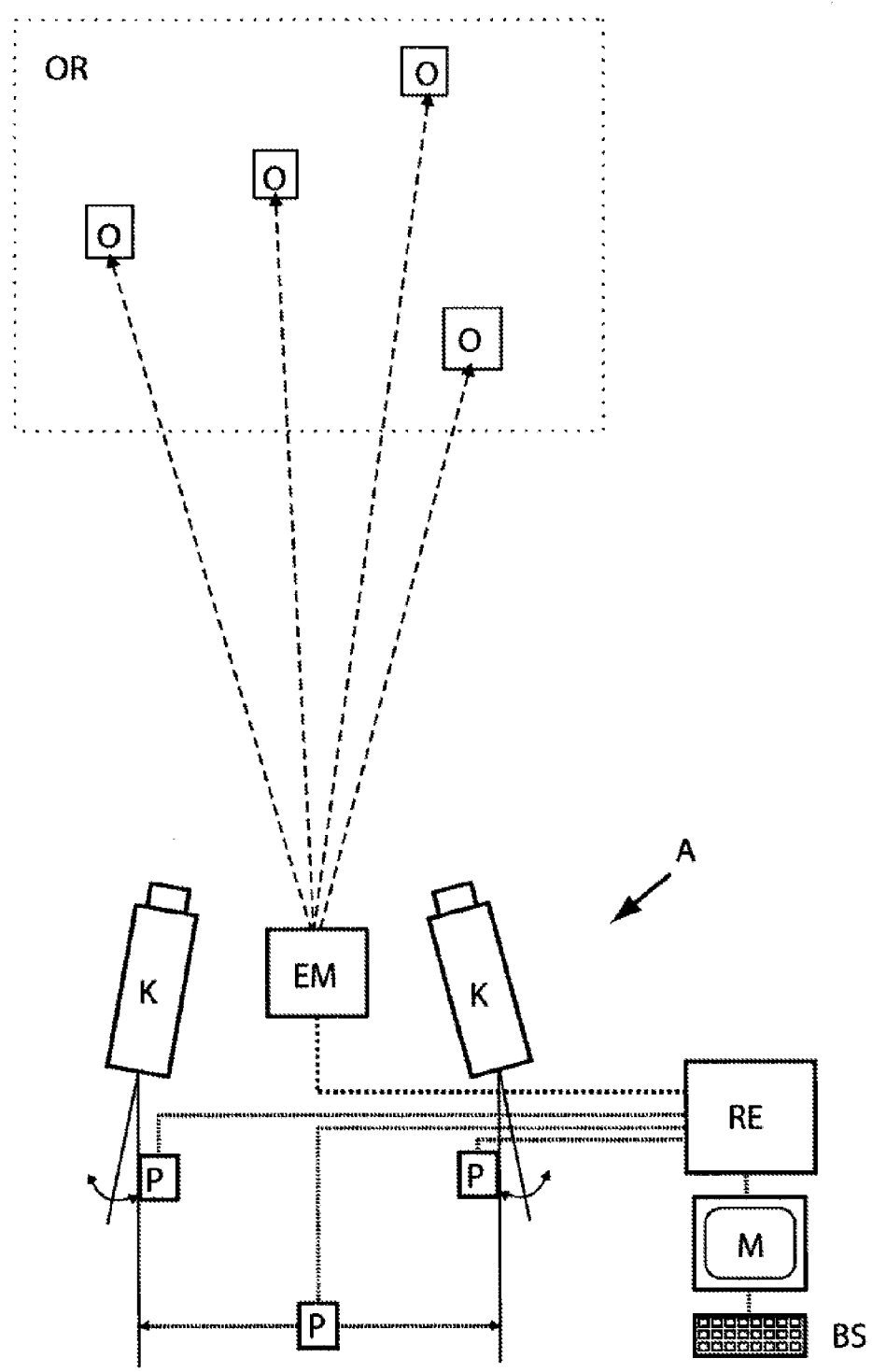
FIG. 1 shows a device for automatic positioning of at least two cameras (K), consisting of a device for distance measurement (EM), object points (O) in an object space (OR) relative to a receiving device (A) measure, a computer unit (RE), several devices for positioning (P), a monitor (M) and a user interface (BS)
Figure 2:
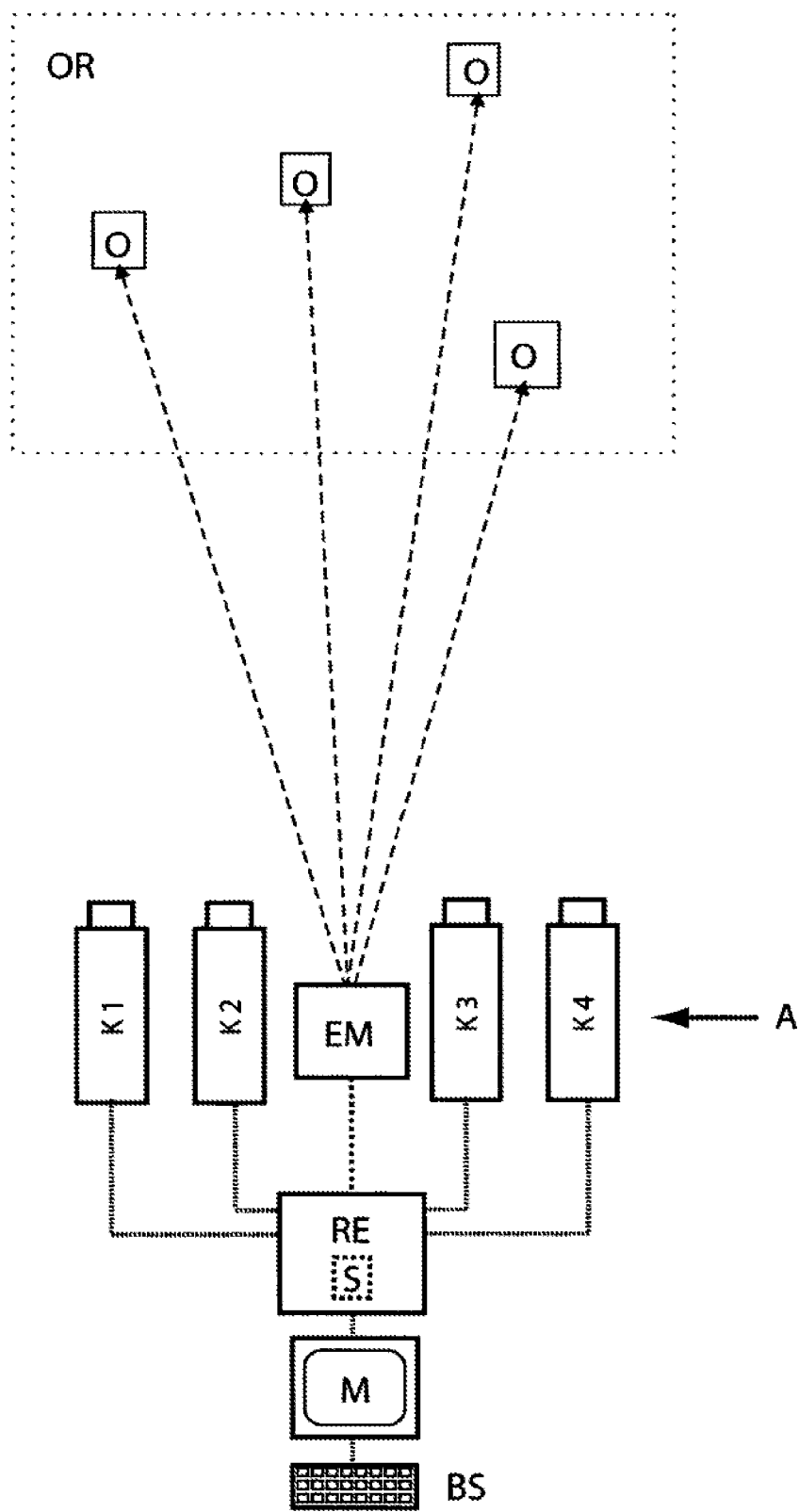
FIG. 2 shows a device for automatic positioning of at least virtual two cameras from n cameras (K1 to Kn)—here n=4—which is a variation of the arrangement of FIG. 1, consisting of a distance measuring device (EM), object points (O) in an object space (OR) relative to a receiving device (A) measure, a computer unit (RE), a switching device (S), which is integrated in the computer unit (RE) and depending on the magnitude of the stereo base selects the suitable cameras, monitor (M) and a user interface (BS).

The invention claimed is:

1. Apparatus for automatic positioning of at least two coupled cameras for three-dimensional image recording comprising:
a device for distance measurement to read distances of relevant spots/objects in an object space relative to a recording device to provide corresponding output signals, wherein relevant objects can be chosen manually or automatically,
a computational device to calculate an interaxial distance and parameters for at least some of angle of convergence, correction parameters and inner parameters of the cameras depending on an output of the device for distance measurement, and
a device for positioning that allows an adjustment updated automatically or adjusted to conditions respectively of at least the interaxial distance of the cameras by a motor dependent on the calculated interaxial distance and other calculated parameters of the computational device,
wherein said distance measurement device being selected from the group consisting of an ultrasonic device, an autofocus device, a laser measurement system, a stereo camera, and a triangulation device.

2. Apparatus for automatic choice of at least three coupled cameras for three-dimensional image recording comprising
a device for distance measurements to read distances of relevant spots/objects in an object space relatively to a recording device and to provide corresponding output signals, wherein relevant objects can be chosen manually or automatically,
a computational device to calculate an interaxial distance and parameters for at least some correction parameters and inner parameters of the cameras depending on an output of the device for distance measurement, and
a device for switching which can be an unity with the computational device to choose at least two cameras dependent on a calculated value of the interaxial distance,
wherein said distance measurement device being selected from the group consisting of an ultrasonic device, an autofocus device, a laser measurement system, a stereo camera, and a triangulation device.

3. Apparatus as set forth in claim 1, wherein the device for positioning of the cameras has stepper motors.

4. Apparatus as set forth in claim 1, wherein the device for positioning of the cameras is adjustable by user interaction or automatically by the computational device.

5. Apparatus as set forth in claim 1, further comprising a monitor configured to visualize the limits of a three-dimensional image design.

6. Apparatus as set forth in claim 1, further comprising a displaying device disposed on the recording device and configured to visualize the limits of a three-dimensional image design.

7. Apparatus as set forth in claim 5, wherein the monitor is able to show the actual position of at least one of the cameras and provide suggestions for a change of the positioning of at least one of the cameras.

8. Apparatus as set forth in claim 1, wherein the degree of adjustment provided by the device for positioning is limited electronically or mechanically.

9. Apparatus as set forth in claim 1, further comprising a three-dimensional displaying device configured to present the limits of a three-dimensional image design in a three-dimensional image by use of the computational device and/or that to displace stereoscopic fields of the cameras in relation to each other electronically or mechanically, corresponding to calculations in an automatic way or manual interaction.

10. Apparatus as set forth in claim 9, further comprising a projection device to present the limits of a three-dimensional image design by projection of those limits into the object space.

11. Apparatus as set forth in claim 10, wherein the projection device projects the limits of a three-dimensional image design into selected wavelength areas or projects it into time intervals, that are synchronized with the cameras in a way that the projection does not disturb the three-dimensional recording, but is otherwise perceptible during recording.

12. Apparatus as set forth in claim 1, wherein the computational device has a program to display or execute suggestions for a depth composition from prerecorded data.

13. Apparatus as set forth in claim 12, wherein the computational device has a program to display or execute suggestions for a depth composition from prerecorded data.

14. Apparatus as set forth in claim 6, wherein the monitor is configured to show the actual position of at least one of the cameras and provide suggestions for a change of the positioning of at least one of the cameras.

15. Apparatus as set forth in claim 1, further comprising a recording device to record data calculated for a three-dimensional recorded image/image recording and meta data.

* * * * *